(12) United States Patent
Wittkopp et al.

(10) Patent No.: US 8,047,950 B2
(45) Date of Patent: Nov. 1, 2011

(54) MULTI-SPEED TRANSMISSION

(75) Inventors: Scott H. Wittkopp, Ypsilanti, MI (US); Andrew W. Phillips, Rochester, MI (US); James M. Hart, Belleville, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 454 days.

(21) Appl. No.: 12/372,348

(22) Filed: Feb. 17, 2009

(65) Prior Publication Data

US 2010/0210403 A1 Aug. 19, 2010

(51) Int. Cl.
*F16H 3/62* (2006.01)
*F16H 3/44* (2006.01)

(52) U.S. Cl. ........................ 475/276; 475/280

(58) Field of Classification Search ............... 475/275, 475/276, 280, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,556,582 B2 * | 7/2009 | Gumpoltsberger | 475/271 |
| 7,566,283 B2 * | 7/2009 | Gumpoltsberger | 475/275 |
| 7,575,533 B2 * | 8/2009 | Gumpoltsberger | 475/280 |
| 7,632,206 B2 * | 12/2009 | Gumpoltsberger | 475/275 |
| 7,946,948 B2 * | 5/2011 | Phillips et al. | 475/284 |
| 2009/0192012 A1 * | 7/2009 | Phillips et al. | 475/284 |
| 2010/0210400 A1 * | 8/2010 | Phillips et al. | 475/275 |
| 2010/0210402 A1 * | 8/2010 | Phillips et al. | 475/275 |
| 2010/0210405 A1 * | 8/2010 | Phillips et al. | 475/284 |
| 2010/0210406 A1 * | 8/2010 | Phillips et al. | 475/286 |

* cited by examiner

*Primary Examiner* — David D Le
*Assistant Examiner* — Michael Gonzalez

(57) ABSTRACT

A transmission of the present invention has an input member, an output member, four planetary gear sets, a plurality of coupling members and a plurality of torque transmitting devices. Each of the planetary gear sets includes first, second and third members. The torque transmitting devices may include clutches and brakes. The torque transmitting devices are selectively engageable in combinations of at least three to establish at least nine forward speed ratios and at least one reverse speed ratio.

16 Claims, 2 Drawing Sheets

| GEAR STATE | GEAR RATIO | RATIO STEP | TORQUE TRANSMITTING ELEMENTS | | | | | |
|---|---|---|---|---|---|---|---|---|
| | | | 34 | 36 | 28 | 32 | 30 | 26 |
| Rev | -6.480 | | X | | X | | | |
| N | | -1.13 | O | | | | | |
| 1st | 5.760 | | X | | | | | X |
| 2nd | 3.400 | 1.69 | X | | | X | | |
| 3rd | 2.417 | 1.41 | | | | X | | X |
| 4th | 1.706 | 1.42 | | X | | X | | |
| 5th | 1.352 | 1.26 | | | X | X | | |
| 6th | 1.000 | 1.35 | | | | X | X | |
| 7th | 0.792 | 1.26 | | | X | | X | |
| 8th | 0.706 | 1.12 | | X | | | X | |
| 9th | 0.629 | 1.12 | | | | | X | X |

X = ON - ENGAGED CARRYING TORQUE
O = ON - ENGAGED NOT CARRYING TORQUE

FIG. 3

MULTI-SPEED TRANSMISSION

FIELD

The invention relates generally to a multiple speed transmission having a plurality of planetary gear sets and a plurality of torque transmitting devices, and more particularly to a transmission having nine or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In an aspect of the present invention a transmission is provided having an input member, an output member, a first, second, third and fourth planetary gear sets each having sun gears, carrier members and ring gears. The input member is continuously interconnected with at least one of the sun gear member of the first planetary gear set and the sun gear member of the second planetary gear set. The output member is continuously interconnected with at least one of the ring gear member of the fourth planetary gear set and the carrier member of the third planetary gear set.

Additionally, a first interconnecting member continuously interconnects the sun gear member of the first planetary gear set with the sun gear member of the second planetary gear set, a second interconnecting member continuously interconnects the ring gear member of the first planetary gear set with the carrier member of the second planetary gear set, a third interconnecting member continuously interconnects the carrier member of the second planetary gear set with a stationary member, a fourth interconnecting member continuously interconnects the carrier member of the third planetary gear set with the ring gear member of the fourth planetary gear set and a fifth interconnecting member continuously interconnects the ring gear member of the third planetary gear set with the carrier member of the fourth planetary gear set Further, a first torque transmitting device is selectively engageable to interconnect the ring gear member of the second planetary gear set with the sun gear member of the fourth planetary gear set, a second torque transmitting device is selectively engageable to interconnect the carrier member of the first planetary gear set with the sun gear member of the fourth planetary gear set, a third torque transmitting device is selectively engageable to interconnect the sun gear member of the first planetary gear set with the carrier member of the fourth planetary gear set, a fourth torque transmitting device is selectively engageable to interconnect the sun gear member of the first planetary gear set with the sun gear member of the third planetary gear set, a fifth torque transmitting device is selectively engageable to interconnect the ring gear member of the third planetary gear set and the carrier member of the fourth planetary gear set with the stationary member and a sixth torque transmitting device is selectively engageable to interconnect the sun gear member of the fourth planetary gear set with the stationary member. The torque transmitting devices are selectively engageable in combinations of at least two to establish at least nine forward speed ratios and at least one reverse speed ratio between the input member and the output member.

It is thus an object of the present invention to provide a transmission having four planetary gear sets.

It is a further object of the present invention to provide a transmission having nine forward speeds and at least one reverse.

It is a still further object of the present invention to provide a transmission having four planetary gear sets, a plurality of coupling members and a plurality of torque transmitting devices.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the nine speed automatic transmission of the present invention has an arrangement of permanent mechanical connections between the elements of the four planetary gear sets. A first component or element of a first planetary gear set is permanently coupled to a first component or element of a second planetary gear set. A third component or element of the first planetary gear set is permanently coupled to a second component or element of a second planetary gear set. The second component or element of the second planetary gear set is permanently coupled to a stationary member. A second component or element of the third planetary gear set is permanently coupled to a first component or element of a fourth planetary gear set. Finally, a third component or element of the third planetary gear set is permanently coupled to a second component or element of a fourth planetary gear set.

Figure 1:
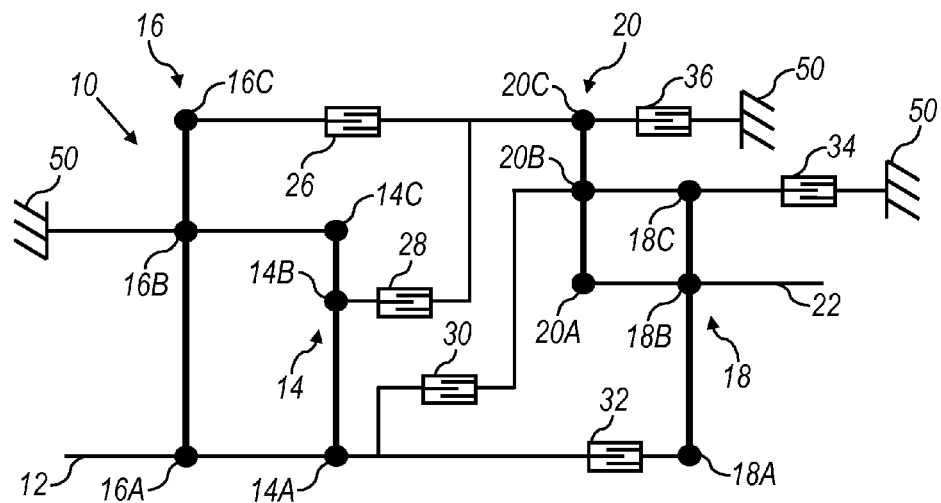
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the first node 16A of the second planetary gear set 16. The first node 14A of the first planetary gear set 14 is coupled to the first node 16A of the second planetary gear set 16. The third node 14C of the first planetary gear set 14 is coupled to the second node 16B of the second planetary gear set 16. The second node 16B of the second planetary gear set 16 is coupled to a stationary member or the transmission housing 50. The second node 18B of the third planetary gear set 18 is coupled to the first node 20A of the fourth planetary gear set 20. The third node 18C of the third planetary gear set 18 is coupled to the second node 20B of the fourth planetary gear set 20. The output member 22 is coupled to the second node 18B of the third planetary gear set 18.

A first clutch 26 selectively connects the third node 16C of the second planetary gear set 16 with the third node 20C of the fourth planetary gear set 20. A second clutch 28 selectively connects the second node 14B of the first planetary gear set 14 with the third node 20C of the fourth planetary gear set 20. A third clutch 30 selectively connects the second node 20B of the fourth planetary gear set 20 with the first node 14A of the first planetary gear set 14. A fourth clutch 32 selectively connects the first node 18A of the third planetary gear set 18 with the first node 14A of the first planetary gear set 14. A first brake 34 selectively connects the second node 20B of the fourth planetary gear set 20 with a stationary element or a transmission housing 50. A second brake 36 selectively connects the third node 20C of the fourth planetary gear set 20 with the stationary element or the transmission housing 50.

Figure 2:
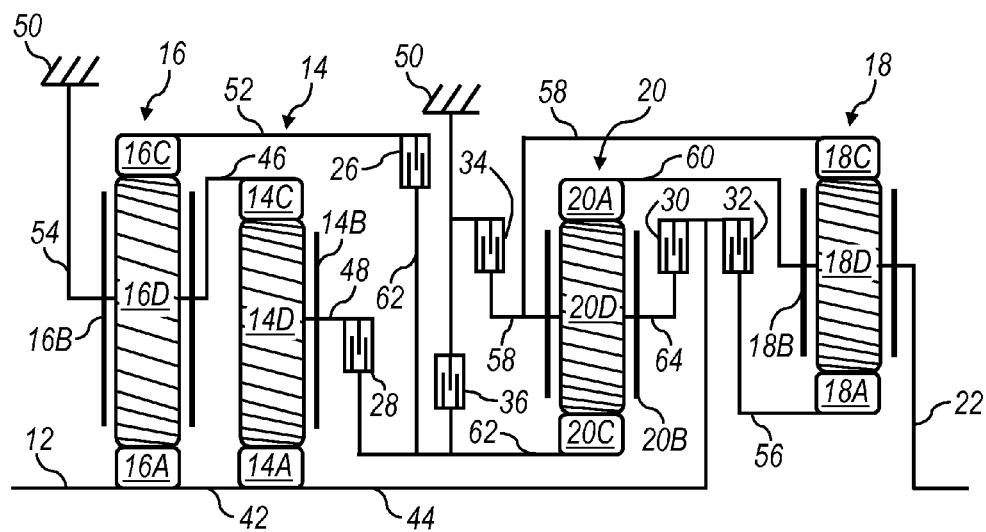
FIG. 2 is a diagrammatic view of an embodiment of a nine speed transmission according to the present invention.

Referring now to FIG. 2, a stick diagram presents a schematic layout of the embodiment of the nine speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The planet gears 14D are each configured to intermesh with both the sun gear member 14A and the ring gear member 14C. The sun gear member 14A is connected to a first shaft or interconnecting member 42 and to a second shaft or interconnecting member 44. The ring gear member 14A is connected for common rotation with a third shaft or interconnecting member 46. The planet carrier member 14B is connected for common rotation with a fourth shaft or interconnecting member 48.

The planetary gear set 16 includes a sun gear member 16A, a ring gear member 16C and a planet gear carrier member 16B that rotatably supports a set of planet gears 16D (only one of which is shown). The planet gears 16D are each configured to intermesh with both the sun gear member 16A and the ring gear member 16C. The sun gear member 16A is connected for common rotation with the first shaft or interconnecting member 42 and with input shaft or member 12. The ring gear member 16C is connected for common rotation with a fifth shaft or interconnecting member 52. The planet carrier member 16B is connected to a sixth shaft or interconnecting member 54 that is connected to a stationary member 50, thus preventing rotation of carrier member 16B relative to stationary member 50. Additionally, the planet carrier member 16B is connected to third shaft or interconnecting member 46.

The planetary gear set 18 includes a sun gear member 18A, a ring gear member 18C and a planet gear carrier member 18B that rotatably supports a set of planet gears 18D (only one of which is shown). The set of planet gears 18D are each configured to intermesh with both the sun gear member 18A and the ring gear member 18C. The sun gear member 18A is connected for common rotation with a seventh shaft or interconnecting member 56. The ring gear member 18C is connected for common rotation with an eighth shaft or interconnecting member 58. The planet carrier member 18B is connected for common rotation with a ninth shaft or interconnecting member 60 and with output shaft or member 22.

The planetary gear set 20 includes a sun gear member 20C, a ring gear member 20A and a planet gear carrier member 20B that rotatably supports a set of planet gears 20D (only one of which is shown). The set of planet gears 20D are each configured to intermesh with both the sun gear member 20C and ring gear member 20A. The sun gear member 20C is connected for common rotation with a tenth shaft or interconnecting member 62. The ring gear member 20A is connected for common rotation with the ninth shaft or interconnecting member 60. The planet carrier member 20B is connected for common rotation with the eighth shaft or interconnecting member 58 and with an eleventh shaft or interconnecting member 64.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or the clutches 26, 28, 30, 32 and the brakes 34 and 36 allow for selective interconnection of the shafts or interconnecting members, members of the planetary gear sets and the housing. For example, the first clutch 26 is selectively engageable to connect the fifth shaft or interconnecting member 52 with the tenth shaft or interconnecting member 62. The second clutch 28 is selectively engageable to connect the fourth shaft or interconnecting member 48 with the tenth shaft or interconnecting member 62. The third clutch 30 is selectively engageable to connect the second shaft or interconnecting member 44 with the eleventh shaft or interconnecting member 64. The fourth clutch 32 is selectively engageable to connect the second shaft or interconnecting member 44 with the seventh shaft or interconnecting member 56. The first brake 34 is selectively engageable to connect the eighth shaft or interconnecting member 58 with a stationary element or the transmission housing 50 in order to prevent the eighth shaft or interconnecting member 58 from rotating relative to the transmission housing 50. The second brake 36 is selectively engageable to connect the tenth shaft or interconnecting member 62 with a stationary element or the transmission housing 50 in order to prevent the tenth shaft or interconnecting member 62 from rotating relative to the transmission housing 50.

Referring now to FIGS. 2 and 3, the operation of the embodiment of the nine speed transmission 10 will be described. It will be appreciated that the transmission 10 is capable of transmitting torque from the input shaft or member 12 to the output shaft or member 22 in at least nine forward speed or torque ratios and at least one reverse speed or torque ratio with a triple overdrive. Each forward and reverse speed or torque ratio is attained by engagement of one or more of the torque-transmitting mechanisms (i.e. first clutch 26, second clutch 28, third clutch 30, fourth clutch 32, first brake 34 and second brake 36), as will be explained below. FIG. 3 is a truth table presenting the various combinations of torque-transmitting elements that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the second clutch 28 and the first brake 34 are engaged or activated. The second clutch 28 connects the fourth shaft or interconnecting member 48 with the tenth shaft or interconnecting member 62. The first brake 34 connects the eighth shaft or interconnecting member 58 with a stationary element or the transmission housing 50 in order to prevent the eighth shaft or interconnecting member 58 from rotating relative to the transmission housing 50. Likewise, the nine forward ratios are achieved through different combinations of clutch and brake engagement, as shown in FIG. 3.

It will be appreciated that the foregoing explanation of operation and gear states of the nine speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:
1. A transmission comprising:
an input member;
an output member;
first, second, third and fourth planetary gear sets each having first, second and third members;
a first interconnecting member continuously interconnecting the first member of the first planetary gear set with the first member of the second planetary gear set;
a second interconnecting member continuously interconnecting the third member of the first planetary gear set with the second member of the second planetary gear set;
a third interconnecting member continuously interconnecting the second member of the second planetary gear set with a stationary member;
a fourth interconnecting member continuously interconnecting the second member of the third planetary gear set with the first member of the fourth planetary gear set;
a fifth interconnecting member continuously interconnecting the third member of the third planetary gear set with the second member of the fourth planetary gear set; and
six torque transmitting devices each selectively engageable to interconnect at least one of the first, second, and third members with at least one other of the first members, second members, third members, and a stationary member, and
wherein the torque transmitting devices are selectively engageable in combinations of at least two to establish at least nine forward speed ratios and at least one reverse speed ratio between the input member and the output member.

2. The transmission of claim 1 wherein a first of the six torque transmitting devices is selectively engageable to interconnect the third member of the second planetary gear set with the third member of the fourth planetary gear set.

3. The transmission of claim 2 wherein a second of the six torque transmitting devices is selectively engageable to interconnect the second member of the first planetary gear set with the third member of the fourth planetary gear set.

4. The transmission of claim 3 wherein a third of the six torque transmitting devices is selectively engageable to interconnect the first member of the first planetary gear set with the second member of the fourth planetary gear set.

5. The transmission of claim 4 wherein a fourth of the six torque transmitting devices is selectively engageable to interconnect the first member of the first planetary gear set with the first member of the third planetary gear set.

6. The transmission of claim 5 wherein a fifth of the six torque transmitting devices is selectively engageable to interconnect the third member of the third planetary gear set and the second member of the fourth planetary gear set with the stationary member.

7. The transmission of claim 6 wherein a sixth of the six torque transmitting devices is selectively engageable to interconnect the third member of the fourth planetary gear set with the stationary member.

8. The transmission of claim 1 wherein the third member of the first planetary gear set, the third member of the second planetary gear set, the third member of the third planetary gear set and the first member of the fourth planetary gear set are ring gears, the second member of the first planetary gear set, the second member of the second planetary gear set, the second member of the third planetary gear set and the second member of the fourth planetary gear set are carrier members and the first member of the first planetary gear set, the first member of the second planetary gear set, the first member of the third planetary gear set and the third member of the fourth planetary gear set are sun gears.

9. The transmission of claim 1 wherein the input member is continuously interconnected with the first member of the first planetary gear set and the first member of the second planetary gear set and wherein the output member is continuously interconnected with the first member of the fourth planetary gear set and the second member of the third planetary gear set.

10. The transmission of claim 1 wherein two of the six torque transmitting devices are brakes and four of the six torque transmitting devices are clutches.

11. The transmission of claim 1 wherein the stationary member is a transmission housing.

12. A transmission comprising:
an input member;
an output member;
first, second, third and fourth planetary gear sets each having first, second and third members, wherein the input member is continuously interconnected with at least one of the first member of the first planetary gear set and the first member of the second planetary gear set and wherein the output member is continuously interconnected with at least one of the first member of the fourth planetary gear set and the second member of the third planetary gear set
a first interconnecting member continuously interconnecting the first member of the first planetary gear set with the first member of the second planetary gear set;
a second interconnecting member continuously interconnecting the third member of the first planetary gear set with the second member of the second planetary gear set;
a third interconnecting member continuously interconnecting the second member of the second planetary gear set with a stationary member;
a fourth interconnecting member continuously interconnecting the second member of the third planetary gear set with the first member of the fourth planetary gear set;
a fifth interconnecting member continuously interconnecting the third member of the third planetary gear set with the second member of the fourth planetary gear set;
a first torque transmitting device selectively engageable to interconnect the third member of the second planetary gear set with the third member of the fourth planetary gear set;
a second torque transmitting device selectively engageable to interconnect the second member of the first planetary gear set with the third member of the fourth planetary gear set;
a third torque transmitting device selectively engageable to interconnect the first member of the first planetary gear set with the second member of the fourth planetary gear set;
a fourth torque transmitting device selectively engageable to interconnect the first member of the first planetary gear set with the first member of the third planetary gear set;
a fifth torque transmitting device selectively engageable to interconnect the third member of the third planetary gear set and the second member of the fourth planetary gear set with the stationary member; and
a sixth torque transmitting device selectively engageable to interconnect the third member of the fourth planetary gear set with the stationary member, and
wherein the torque transmitting devices are selectively engageable in combinations of at least two to establish at least nine forward speed ratios and at least one reverse speed ratio between the input member and the output member.

13. The transmission of claim 12 wherein the third member of the first planetary gear set, the third member of the second planetary gear set, the third member of the third planetary gear set and the first member of the fourth planetary gear set are ring gears, the second member of the first planetary gear set, the second member of the second planetary gear set, the second member of the third planetary gear set and the second member of the fourth planetary gear set are carrier members and the first member of the first planetary gear set, the first member of the second planetary gear set, the first member of the third planetary gear set and the third member of the fourth planetary gear set are sun gears.

14. The transmission of claim 12 wherein the stationary member is a transmission housing.

15. A transmission comprising:
an input member;
an output member;
first, second, third and fourth planetary gear sets each having sun gears, carrier members and ring gears, wherein the input member is continuously interconnected with at least one of the sun gear member of the first planetary gear set and the sun gear member of the second planetary gear set and wherein the output member is continuously interconnected with at least one of the ring gear member of the fourth planetary gear set and the carrier member of the third planetary gear set;
a first interconnecting member continuously interconnecting the sun gear member of the first planetary gear set with the sun gear member of the second planetary gear set;
a second interconnecting member continuously interconnecting the ring gear member of the first planetary gear set with the carrier member of the second planetary gear set;
a third interconnecting member continuously interconnecting the carrier member of the second planetary gear set with a stationary member;
a fourth interconnecting member continuously interconnecting the carrier member of the third planetary gear set with the ring gear member of the fourth planetary gear set;
a fifth interconnecting member continuously interconnecting the ring gear member of the third planetary gear set with the carrier member of the fourth planetary gear set;
a first torque transmitting device selectively engageable to interconnect the ring gear member of the second planetary gear set with the sun gear member of the fourth planetary gear set;
a second torque transmitting device selectively engageable to interconnect the carrier member of the first planetary gear set with the sun gear member of the fourth planetary gear set;
a third torque transmitting device selectively engageable to interconnect the sun gear member of the first planetary gear set with the carrier member of the fourth planetary gear set;
a fourth torque transmitting device selectively engageable to interconnect the sun gear member of the first planetary gear set with the sun gear member of the third planetary gear set;
a fifth torque transmitting device selectively engageable to interconnect the ring gear member of the third planetary gear set and the carrier member of the fourth planetary gear set with the stationary member; and a sixth torque transmitting device selectively engageable to interconnect the sun gear member of the fourth planetary gear set with the stationary member, and wherein the torque transmitting devices are selectively engageable in combinations of at least two to establish at least nine forward speed ratios and at least one reverse speed ratio between the input member and the output member.

16. The transmission of claim 15 wherein the stationary member is a transmission housing.

* * * * *